United States Patent
Prada Gomez et al.

(10) Patent No.: US 8,724,853 B2
(45) Date of Patent: *May 13, 2014

(54) IDENTIFYING A TARGET OBJECT USING OPTICAL OCCLUSION

(75) Inventors: Luis Ricardo Prada Gomez, Hayward, CA (US); Liang-Yu (Tom) Chi, San Francisco, CA (US); Robert Allen Ryskamp, Zurich (CH)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/493,758

(22) Filed: Jun. 11, 2012

(65) Prior Publication Data

US 2013/0142387 A1 Jun. 6, 2013

Related U.S. Application Data

(63) Continuation of application No. 13/184,900, filed on Jul. 18, 2011, now Pat. No. 8,199,974.

(51) Int. Cl.
*G06K 9/00* (2006.01)

(52) U.S. Cl.
USPC .......................................... 382/103

(58) Field of Classification Search
USPC ......... 382/103, 107, 154, 165, 203, 286, 291, 382/312
See application file for complete search history.

(56) References Cited

U.S. PATENT DOCUMENTS

| 8,199,974 B1* | 6/2012 | Prada Gomez et al. ....... 382/103 |
| 2003/0164819 A1 | 9/2003 | Waibel |
| 2008/0284864 A1* | 11/2008 | Kotake et al. .............. 348/222.1 |
| 2008/0300055 A1 | 12/2008 | Lutnick et al. |
| 2010/0199232 A1 | 8/2010 | Mistry et al. |
| 2011/0227820 A1 | 9/2011 | Haddick et al. |

* cited by examiner

*Primary Examiner* — Phuoc Tran
(74) *Attorney, Agent, or Firm* — McDonnell Boehnen Hulbert & Berghoff LLP

(57) ABSTRACT

Methods are apparatuses are described for identifying a target object using optical occlusion. A head-mounted display perceives a characteristic of a reference object. The head-mounted display detects a change of the perceived characteristic of the reference object and makes a determination that a detected object caused the change of the perceived characteristic. In response to making the determination, the head-mounted display identifies the detected object as the target object.

18 Claims, 6 Drawing Sheets

IDENTIFYING A TARGET OBJECT USING OPTICAL OCCLUSION

BACKGROUND

Computing devices such as personal computers, laptop computers, tablet computers, cellular phones, and countless types of Internet-capable devices are increasingly prevalent in various aspects of modern life. As computers become more advanced, augmented-reality devices, which blend computer-generated information with a user's perception of the physical world, are expected to become more common.

To provide an augmented-reality experience, location and context-aware computing devices may be worn by a user as they go about various aspects of their everyday life. Such computing devices, which are commonly referred to as "wearable" computers, are configured to sense and analyze a user's environment, and to intelligently provide information appropriate to the physical world as it is experienced by the user. Such wearable computers may sense a user's surrounding by, for example, determining a user's geographic location, using cameras and/or sensors to detect objects within the user's field of vision, using microphones and/or sensors to detect what a user is hearing, and using various other sensors to collect information about the environment surrounding the user. Further, wearable computers may use biosensors to detect the user's own physical state. The information collected by the wearable computer may then be analyzed in order to determine what information should be presented to the user.

Many wearable computers include or take the form of a head-mounted display (HMD) that is worn by the user. An HMD typically provides a heads-up display near to the user's eyes. As such, HMDs may also be referred to as "near-eye" displays. HMDs typically overlay computer-generated graphics (e.g., text, images, video, etc.) on the physical world perceived by the user. HMDs may include some form of display that renders graphics in front of one or both of the user's eyes in such a manner that the user perceives the computer-generated graphics and the physical world simultaneously. HMDs that include displays in front of both of the user's eyes are referred to as "binocular" HMDs, while those that include a display in front of just one eye are referred to as "monocular" HMDs.

HMDs may integrate computer-generated graphics in the user's view of the physical world using a number of techniques. For example, "see-through" HMDs may display graphics on a transparent surface so that the user sees the graphics overlaid on the physical world. As another example, "see-around" HMDs overlay a display on the physical world by placing the display close to the user's eye in order to take advantage of the "sharing" of vision between a user's eyes and create the effect of the display being part of the world seen by the user.

In order to sense a user's environment, a wearable computer may include a "point-of-view" video camera that is aligned with the user's frame of reference and mounted so as to track movement of the user's head. By effectively capturing what the user is seeing at a given point in time, this video can be analyzed to detect objects and/or people within the user's view, to identify these objects and/or people, and to display information in the HMD that corresponds to these objects and/or people. Furthermore, analysis of the video may be used to determine where a given object or person is located in the user's frame of reference, and to display corresponding information in the HMD such that the user sees the corresponding information as "floating" over or near the given object or person.

As an example, when a user is looking at a friend, a video camera on the user's HMD may capture video of the friend. The video can then be analyzed using, for example, well-known facial recognition techniques. As such, the friend may be identified, and information related to the friend may be displayed so that the user sees the information proximate to their friend. For example, the HMD may display the friend's name, contact information, birthday, etc.

SUMMARY

In many scenarios, there may be a multitude of objects in proximity to the HMD at a given time. In order for the HMD to be able to interact with objects (e.g., perform facial recognition, optical character recognition, etc.), it may be desirable for the HMD to be able to determine which objects the wearer desires to interact with. One possibility is to design the HMD to allow interaction with a predetermined set of objects. Those objects could be, for example, the wearer's body parts (such as arms, legs, hands, feet, fingers, toes, etc.). However, the wearer may desire to interact with objects other than the predetermined set of objects.

Described herein are methods and apparatuses for identifying a target object using optical occlusion (e.g., the hiding, covering, superposition, or screening of one object by another object). In an embodiment, an HMD perceives a characteristic of a reference object. The HMD detects a change to the perceived characteristic of the reference object and makes a determination that a detected object caused the change to the perceived characteristic. In response to making the determination, the HMD identifies the detected object as the target object.

For example, the HMD may be equipped with a sensor (such as a camera) for perceiving the characteristic. In an embodiment, the reference object could be the HMD wearer's hand, and the perceived characteristic could be the shape or size of the wearer's hand. In this example, when the wearer picks up a business card and holds it in his or her hand, the HMD could detect a change in the shape and size of the wearer's hand as a portion of the hand, from the point-of-view of the sensor, becomes blocked by the business card. Because the business card caused the change in the perceived characteristic, the HMD would identify the business card as the target object. Having determined that the business card (and not another object in the field-of-view of the sensor) is the target object, the HMD could perform various additional functions, such as performing optical character recognition (OCR) on the business card, and storing the text of the business card in an address book, perhaps stored in the HMD or in a smartphone or other devices in communication with the HMD.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

Figure 1:
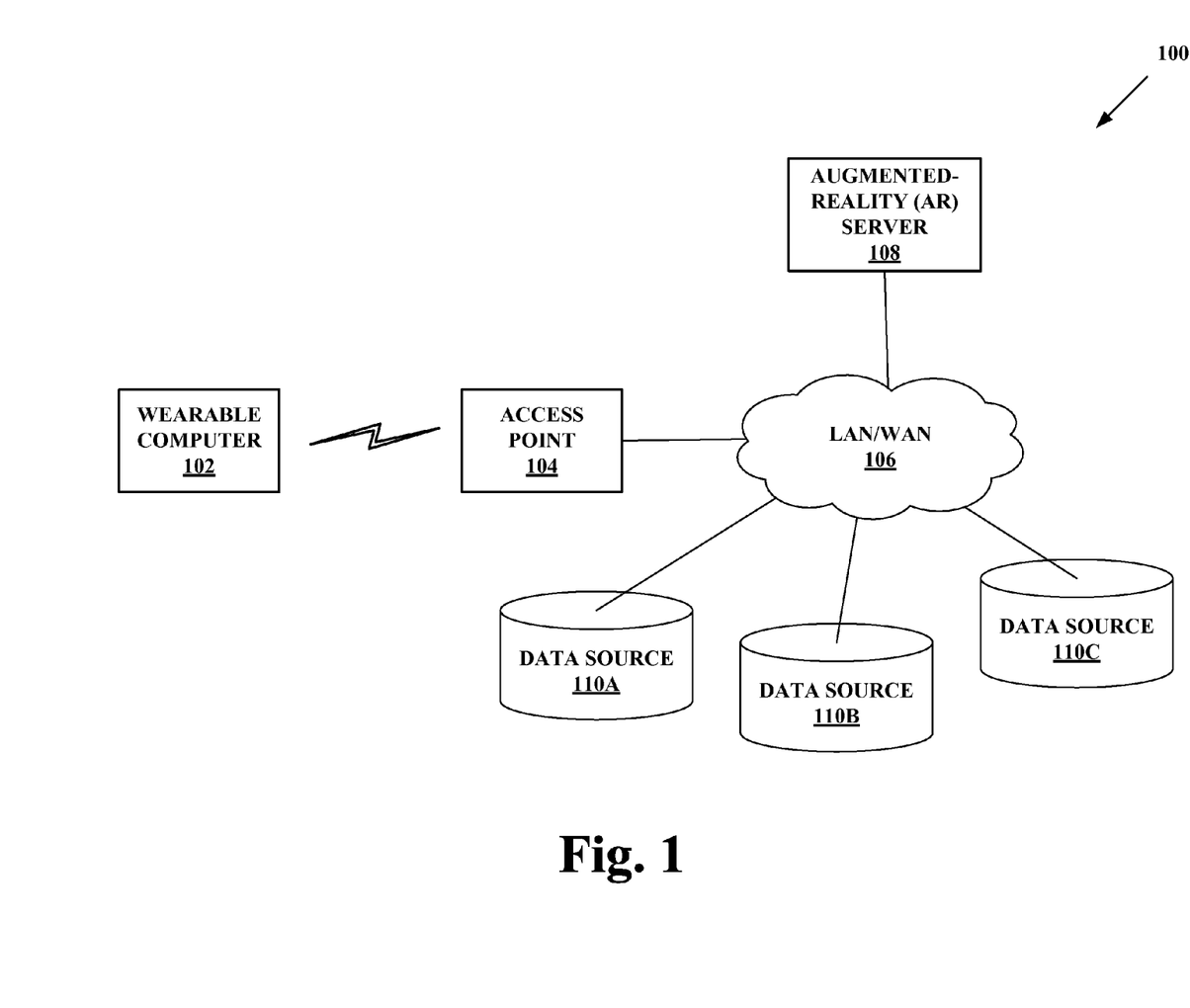
FIG. 1 is a simplified block diagram illustrating an exemplary system in which a wearable computing device can be implemented.

FIG. 1 is a simplified block diagram illustrating an exemplary system in which an exemplary embodiment of a wearable computer can be implemented. It should be understood that this and other arrangements described herein are set forth only as examples. Those skilled in the art will appreciate that other arrangements and elements (e.g., machines, interfaces, functions, orders, and groupings of functions, etc.) can be used instead or in addition, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown, network 100 includes wearable computer 102 in communication with LAN/WAN 106 via access point 104. Network 100 also includes Augmented-Reality (AR) server 108 and data sources 110A-C, each connected to LAN/WAN 106. Additional entities could be present, such as additional wearable computers in communication with access point 104, and additional entities (such as access points, servers, and/or data sources, for example) in communication with Internet 106. Also, there could be one or more devices and/or networks making up at least part of one or more communication links.

Wearable computer 102 may be any device or combination of devices arranged to carry out the wearable-computer functions described herein, and is described in detail with reference to FIG. 2.

Access point 104 may take various forms, such as a wireless access point (WAP) or wireless router for facilitating communication via 802.11 or Ethernet, for example. Additionally or alternatively, access point 104 may take the form of a base station in a cellular network for facilitating communication via the CDMA and/or GSM protocols, among other protocols. Those having skill in the art will recognize that access point 104 may take other forms, and provide communication via other protocols, without departing from the scope of the claims.

LAN/WAN 106 may be the well-known global packet-data network generally referred to as the Internet. However, Internet 106 may also be or include one or more other packet-data networks, without departing from the scope and spirit of the described embodiments. As such, Internet 106 may include one or more wide area networks, one or more local area networks, one or more public networks, one or more private networks, one or more wired networks, one or more wireless networks, and/or one or more networks of any other type. Devices in communication with Internet 106 may exchange data using a packet-switched protocol such as the Internet Protocol (IP), and may be identified by an address such as an IP address.

AR server 108 may, for example, help improve the performance of wearable computer 102. Since size, weight, and/or cost constraints may limit data storage and processing capabilities of a device worn by the user, moving some (or possibly all) of the data-processing functions to a remote entity such as AR server 108 can provide increased processing power to wearable computer 102. This may be useful for the potentially data-intensive analysis of information collected by any sensory components of wearable computer 102, as well as for the control of any display and/or user interface of the wearable computer.

AR server 108 may also include (or be connected to) one or more data stores that allow for retrieval of data supporting the augmented-reality experience for wearable computer 102. For example, AR server 108 may collect data specific to a given wearable computer 102 over time, which can then be used to customize the user's experience. Furthermore, AR server 108 may combine location-specific data collected from a number of different wearable computers at given locations. Such data may then be used in combination with current data from wearable computer 102's sensory devices to customize the HMD display to the current location of wearable computer 102 and/or to the specific user preferences and tendencies of the wearer of wearable computer 102.

Even though AR server 108 and data source 110A-C are shown as connected to wearable computer 102 via LAN/WAN 106, those having skill in the art will recognize that these entities may be connected to the wearable computer through a different connection. For example, AR server 108 and/or data source 110A-C could take the form of a smartphone in communication with the wearable computer via a wired connection (such as USB) or a wireless connection (such as Bluetooth).

It should also be noted that wearable computer 102 may itself include data storage in which the wearable computer stores similar data, and in fact, given sufficient storage and processing power, may function without any support from AR server 108. However, due to the size, weight, and/or cost constraints that may limit data-storage and processing capabilities of wearable computer 102's on-board computing system, a remote entity such as AR server 108 may provide wearable computer 102 with superior data-storage and/or data-retrieval capabilities, and thus may improve the performance of wearable computer 102.

Figure 2:
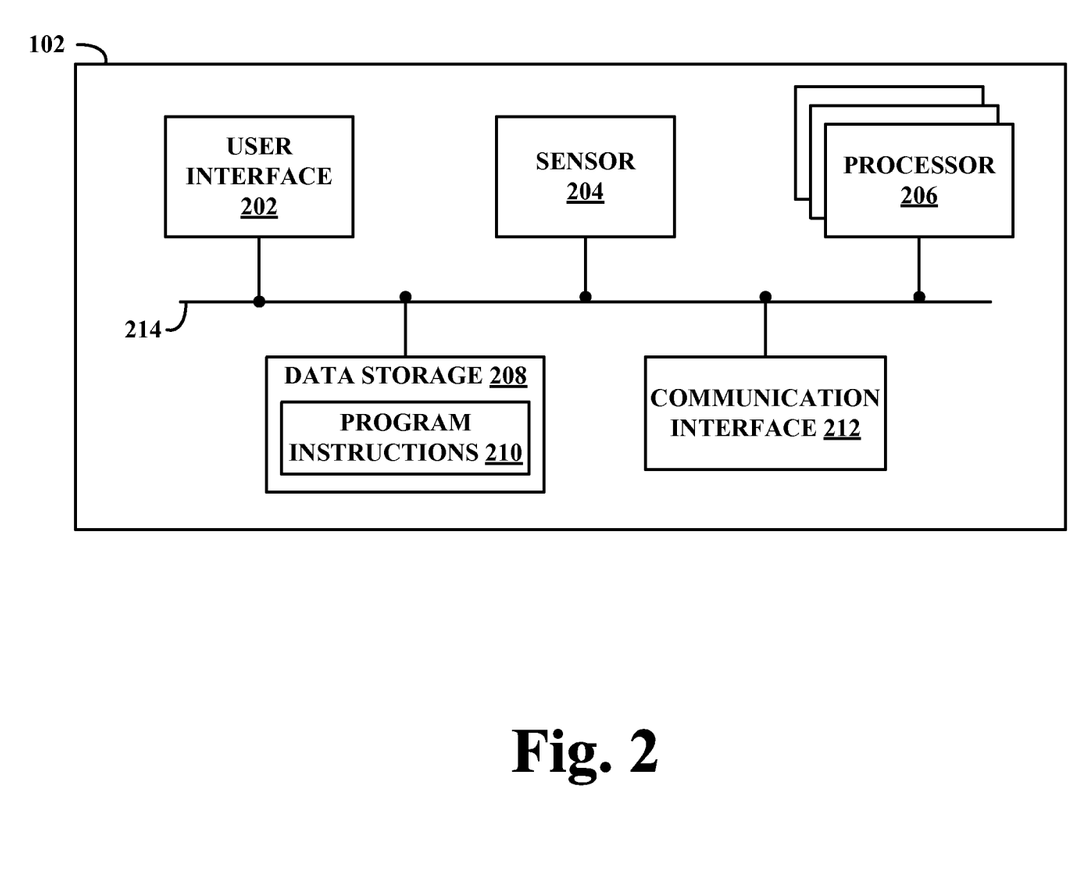
FIG. 2 is a simplified block diagram of a wearable computer, in accordance with exemplary embodiments.

FIG. 2 is a block diagram of a wearable computer. As illustrated, wearable computer 102 may include a user interface 202, a sensor 204, a processor 206, data storage 208 (containing program instructions 210), and communication interface 212, all connected by a bus or other communication link 214. And other entities not shown in FIG. 2 may be present as well, including any other entities now known or later developed for such devices. Further, wearable computer 102 may contain more than one of any one of the entities depicted in FIG. 2, or may contain a subset of those entities illustrated in FIG. 2. Wearable computer 102 may take the form of an HMD, which is described below with reference to FIG. 3.

User interface 202 may function to facilitate interaction with wearable computer 102. Accordingly, user interface 202 may take the form of a display (such as a monocular video display), a speaker, a microphone, a key input, a touchscreen, and/or any other elements for receiving inputs and/or communicating outputs. Furthermore, user interface 202 may interact with one or more input/output devices via communication interface 212, which is described in detail below.

Sensor 204 may be any device suitable for detecting a characteristic of an object, such as a location, color, and/or size of an object, among other examples. As such, sensor 204 may take the form of a camera (such as a range camera, a video camera, and/or or a still camera), a radar, a laser, a Global Positioning System (GPS) receiver, an infrared sensor, an optical sensor, a biosensor, a Radio Frequency identification (RFID) system, a wireless sensor, an accelerometer, a gyroscope, and/or a compass, or any combination of sensors now known or later developed.

Processor 206 may be, for example, a general-purpose microprocessor and/or a discrete signal processor. Though processor 206 is described here as a single processor, those having skill in the art will recognize wearable computer 102 may contain multiple (e.g., parallel) processors.

Data storage 208 may store a set of machine-language program instructions 210 that are executable by processor 208 to carry out various functions described herein. Alternatively, some or all of the functions could instead be implemented through hardware. In addition, data storage 208 may store various data to facilitate carrying out various functions described herein. In addition, data storage 208 may hold user-interface data, among many other possibilities.

Communication interface 212 may facilitate communication with one or more devices such as, for example, a mobile phone, a feature phone, a smartphone, a laptop or desktop computer, a wireless access point, and/or a cellular base station. Communication interface 212 may be able to facilitate communication over a variety of wired and/or wireless interfaces, such as universal serial bus (USB), IEEE 1394 (FireWire), IEEE 802.11 (Wi-Fi), Bluetooth, GSM, GPRS, CDMA, EV-DO, WiMAX, or LTE, among other possibilities.

Figure 3:
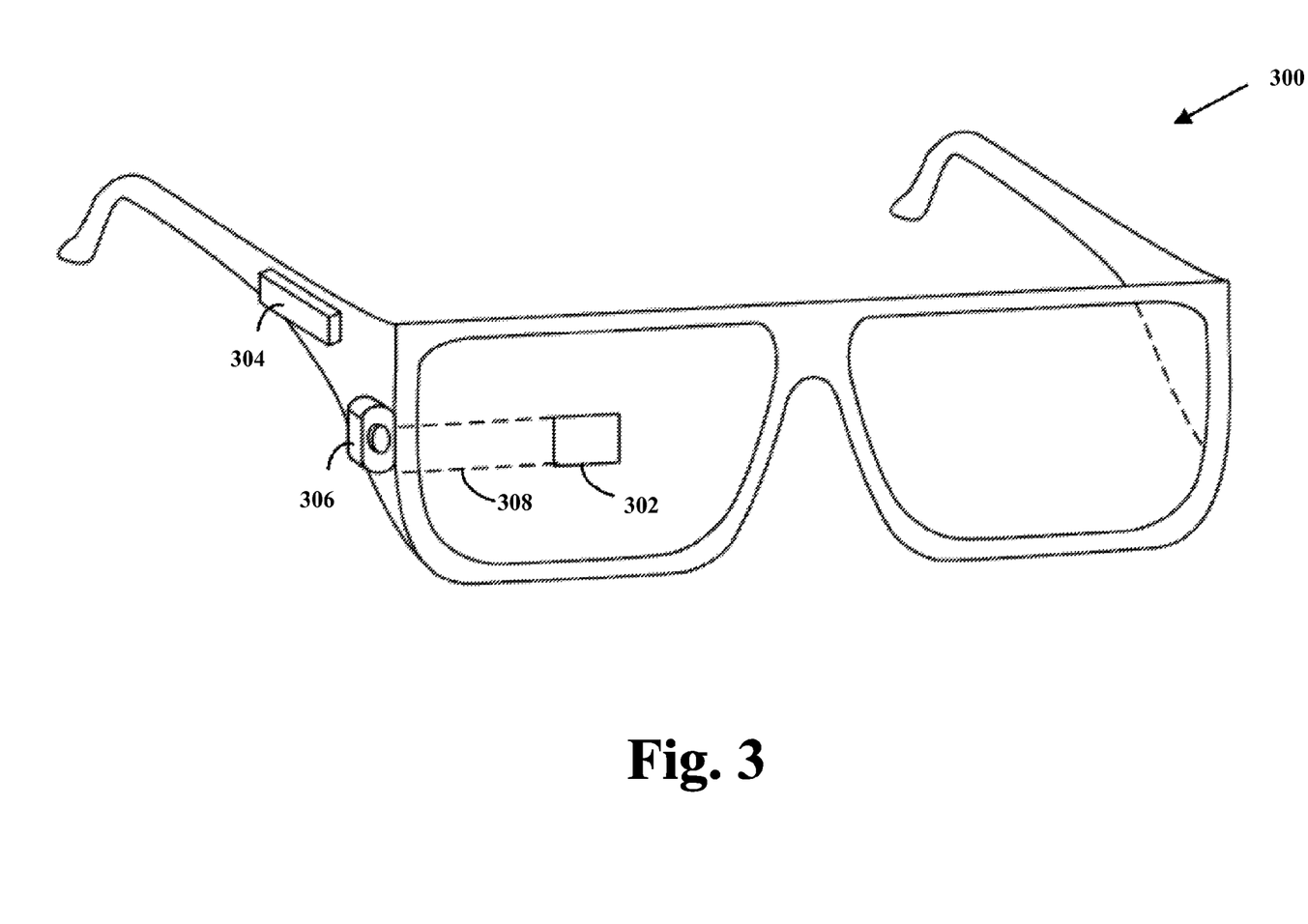
FIG. 3 is a three-dimensional rendering of an HMD, in accordance with exemplary embodiments.

FIG. 3 is a three-dimensional rendering of an exemplary wearable computing device in the form of an HMD. As shown, HMD 300 includes monocular see-around display 302, on-board computing system 304, camera 306, and optical waveguide 308. Note that other entities, such as additional sensors or displays, may be present as well, and that not all entities depicted in FIG. 3 need be present in any particular configuration.

Monocular video display 302 may be positioned and sized such that images being displayed appear to be overlaid upon or to "float" in a user's view of the physical world, thus providing an experience in which computer-generated information is merged with the user's perception of the physical world. To provide this experience, on-board computing system 304 (perhaps in conjunction with additional entities, such AR server 108) may be configured to analyze data that is captured by camera 306 to intelligently determine (a) what graphics should be displayed, and (b) how the graphics should be displayed (e.g., location on the display, size of the graphics, etc.).

On-board computing system 304 may comprise, for example, a processor, data storage that stores a set of machine-language program instructions for carrying out the various HMD functions, and a communication interface. As such, on-board computing system 304 may control monocular video display 302, receive input from camera 306, and/or facilitate communication with AR server 108 (among other entities).

Camera 306 may be mounted on the frame of HMD 300 and may be oriented so as to generally track the wearer's frame of reference (e.g., the wearer's point of view). The type of camera 306 may be selected as a matter of engineering design choice. As such, camera 306 may capture images or video at various different resolutions and/or at different frame rates (e.g., varying frames per second (fps)). Many cameras with a small form-factor, such as those used in cell phones, webcams, etc., may be used with HMD 300. However, it should be understood that exemplary embodiments are not limited to any particular type of camera.

In an exemplary embodiment, camera 306 is mounted so as to capture the user's point-of-view. Specifically, camera 306 is mounted on HMD 300 so that it is positioned and oriented in a substantially same direction as the user's eyes to capture a view substantially similar to the wearer's view. Other configurations are also possible. As just one example, camera 300 could instead be mounted on the user's forehead or in between the user's eyes, and can track the same direction as the user's eyes. Mounted as such, the video camera can track the movement of the user's head, and thus the perspective of the data received by camera 306 at a given point in time will generally capture the user's frame of reference (i.e., the user's view) at that time. It is also possible that an exemplary wearable computer may incorporate video cameras, which may be configured to capture the same view, or to capture different perspectives or views.

Figure 4:
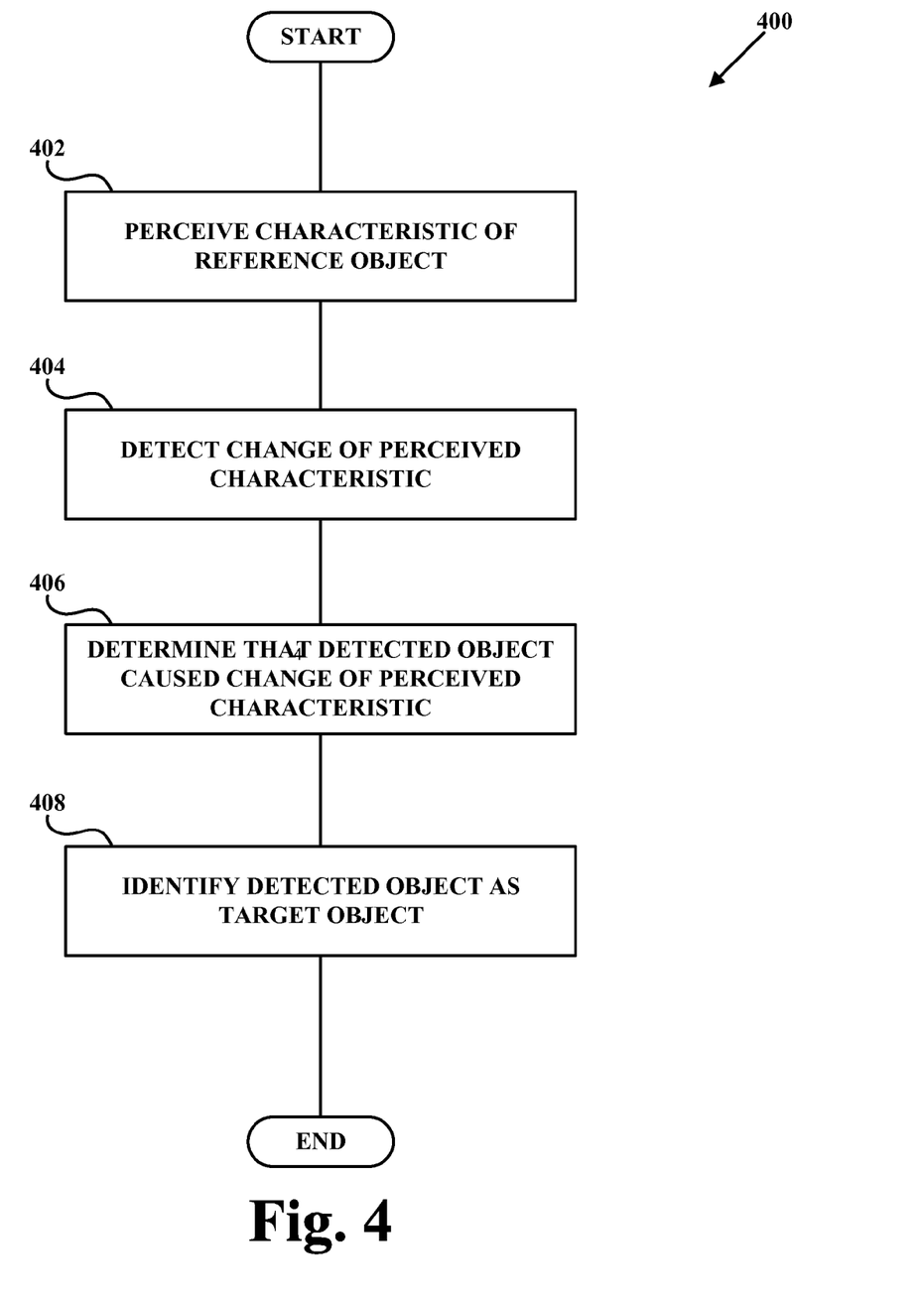
FIG. 4 is a flowchart of a method that can be carried out in accordance with exemplary embodiments.

FIG. 4 depicts a flowchart of a method, in accordance with exemplary embodiments. Though method 400 is described as being carried out by HMD 300, the method may be carried out by any other number of devices, such as wearable computer 102, among other possibilities.

As shown in FIG. 4, method 400 begins at step 402 with HMD 300 perceiving a characteristic of a reference object. The characteristic could be, for example, a shape, a color, a size, an area, and/or a location of an object.

The reference object may be any object that has a characteristic to be perceived. In an exemplary embodiment, the reference object is the hand of the wearer of HMD 300. For example, with reference to FIG. 5, HMD 300 could perceive the shape of reference object 502, which is depicted as a hand and which, as shown at time (a), is open and outstretched. HMD 300 could also perceive the size of the wearer's hand by, for example, perceiving the total visible area of the wearer's hand. Other characteristics of the wearer's hand may be perceived as well.

In another embodiment, the reference object is a computer monitor. In this embodiment, HMD 300 could perceive the total visible area and/or the shape of the computer monitor, among other characteristics. Other examples of reference objects may include other body parts of the wearer (such as a finger or a foot), and/or other objects, such as a television or an automotive windshield (that perhaps includes a heads-up display).

In an exemplary embodiment, the wearer may select an object to be the reference object. For example, HMD 300 (perhaps via camera 306) could detect the presence of one or more objects (perhaps in the field-of-view of the wearer). HMD 300 could then present, via a user interface such as display 302, a prompt asking the wearer to select which object should be the reference object. The wearer could select the reference object using user interface 202, for example.

In another embodiment, HMD 300 determines which object is the reference object. For example, GMD 300 could be designed to function with only one reference object, such as the wearer's hand. Other examples are possible as well without departing from the scope of the claims.

Figure 5:
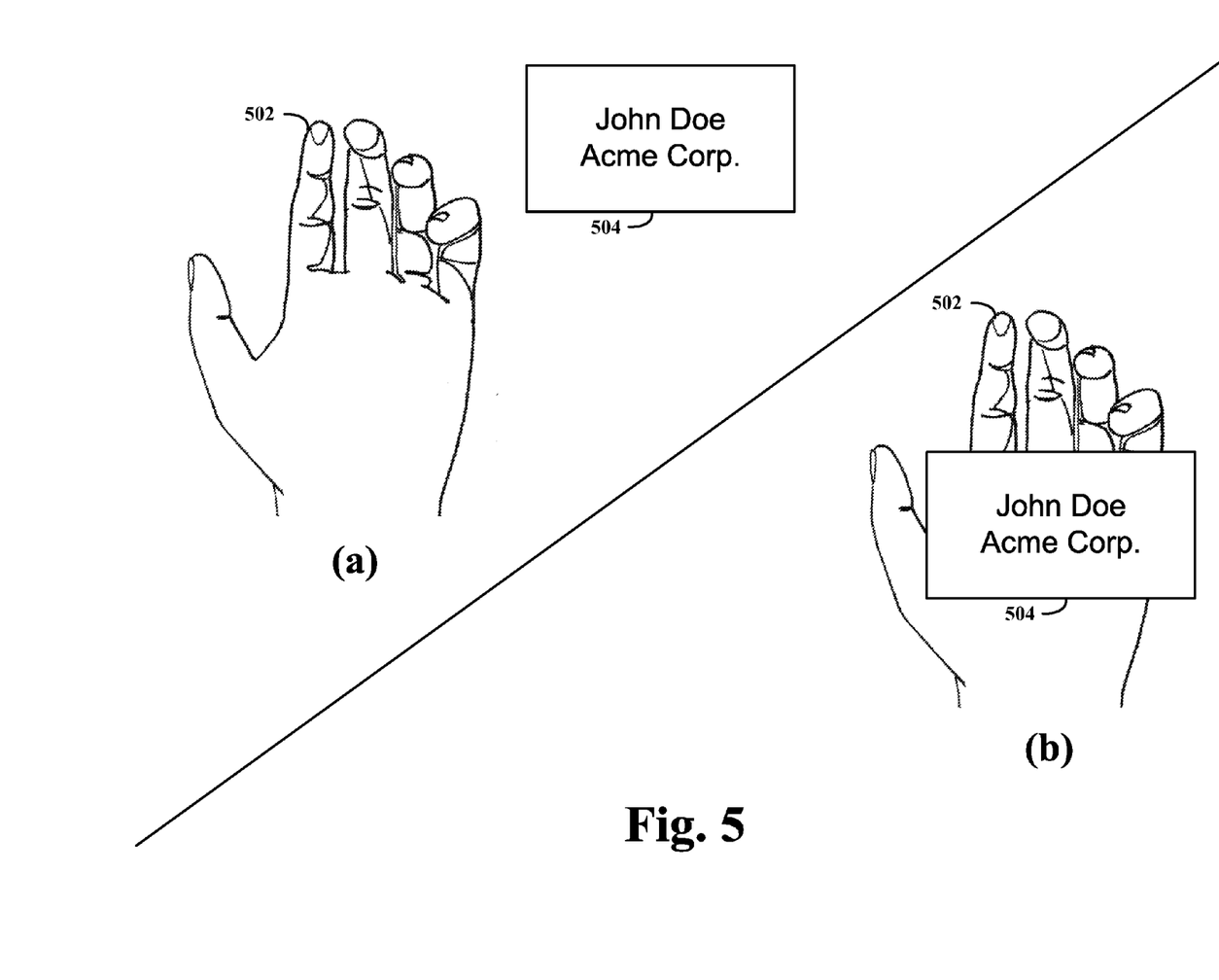
FIG. 5 depicts a use scenario of an HMD, in accordance with exemplary embodiments.

The characteristic of reference object 502 may be perceived using a sensor, such as camera 306. In one embodiment, HMD 300 may perceive the characteristic by using data (such as an indication of the perceived characteristic) collected via camera 306 and sending that data (perhaps using communication interface 212) to another entity, such as AR server 108. AR server 108 may then store the received data for later use, or AR server 108 may send information regarding the perceived characteristic to HMD 300. In another embodiment, HMD 300 perceives the characteristic without the use of AR server 108. Though the separate entity is described as taking the form of AR server 108, those having skill in the art will understand that any other entity may be used as well. For example, the entity could be a smartphone or other device worn by the wearer of HMD 300.

HMD 300 and/or AR server 108 may also store "training data" regarding reference object 502 to assist in perceiving the characteristic of the reference object. In addition to reference object 502, a number of other objects will likely be in the field of view of camera 306, such as detected object 504, as shown at time (a) in FIG. 5. The training data may contain information regarding the general color, size, and shape (for example) of the reference object, which may allow HMD 300 and/or AR server 108 to distinguish reference object 502 from the other objects in view of camera 306.

In an embodiment, HMD 300 may receive an instruction to perceive the characteristic of reference object 502. It may be desirable in certain situations to prevent HMD 300 from attempting to perceive the characteristic, such as when the wearer desires to conserve power and/or battery life of the HMD. Accordingly, HMD 300 may perceive the characteristic of reference object 502 only upon receiving an instruction (perhaps from the wearer of HMD 300) to perceive the characteristic. In another embodiment, HMD 300 may always perceive (or at least attempt to perceive) the characteristic of reference object 502. Other examples are possible as well without departing from the scope of the claims.

Method 400 continues at step 404 with HMD 300 detecting a change of the perceived characteristic of the reference object. If the reference object is the wearer's hand, the perceived characteristic could change as a result of, for example, the wearer grabbing the target object, or putting his or her hand behind the target object. By performing these actions, the shape of the hand changes (as perceived by HMD 300).

For example, with reference to FIG. 5, several perceived characteristics of reference object 502 may have changed between time (a) and time (b). For example, the perceived area of the hand has changed because, at time (b), much of the area is blocked by detected object 504 (represented as a business card). As a corollary, the perceived shape of the hand has changed as a result of the wearer grabbing the business card. Other characteristics not described here may have changed as well.

In one embodiment, HMD 300 may detect the change by using data collected via camera 306 and sending that data to AR server 108. AR server 108 may then compare the received data with data stored in the AR server at step 402. In another embodiment, HMD 300 may detect the change without use of a separate entity.

In another embodiment, HMD 300 may determine that the change in the perceived characteristic has persisted for a minimum threshold of time before proceeding to step 406. For example, if the wearer of HMD 300 was walking and the wearer's hands were swinging in-and-out of view of camera 306, then HMD 300 may detect numerous changes of the perceived characteristics in only a short period of time. To prevent such an outcome, HMD 300 could determine that the change has persisted for at least three seconds (for example) before proceeding to step 406. Other time periods could be used as well.

Method 400 continues at step 406 with HMD 300 making a determination that a detected object caused the change of the perceived characteristic. For example, with reference to FIG. 5, HMD 300 may determine that detected object 504 (business card) caused the change in the shape and/or size of reference object 502 (hand).

Though detected object 504 is depicted as a business card, those having skill in the art will recognize that the detected object could be any object capable of causing a change in the perceived characteristic of reference object 502. As such, detected object 504 could take the form of a smartphone, a book, a DVD, or a food item, among numerous other examples.

Making the determination that detected object 504 caused the change could comprise HMD 300 referencing stored training data to determine that the change in the characteristic of reference object 502 generally could not have occurred but-for the detected object. For example, if reference object 502 is the wearer's hand, then a change in the perceived characteristic could occur if the wearer closed or clinched his or her hand. In such a case, the perceived size and/or shape of the reference object may change, even though a detected object did not cause such change.

Accordingly, the training data could store information regarding whether the change in the perceived characteristic could have occurred but-for the presence of detected object 504. For example, as shown in FIG. 5, the perceived shape of the wearer's hand would include a void (as perceived by the HMD) due to the presence of the business card. This "hole" in the wearer's hand would generally not occur except for the presence of a detected object.

Though one method is described for making the determination that the detected object caused the change in the perceived characteristic, those having skill in the art will recognize that other methods are possible without departing from the scope and spirit of the claims.

Method 400 continues at step 408 with HMD 300 identifying the detected object as the target object. In one embodiment, HMD 300 could identify detected object 504 as the target object without any intervention by the wearer, and subsequently perform additional operations using the target object.

In another embodiment, HMD 300 could present a prompt requesting a confirmation that detected object 504 is the target object, and receive a confirmation that detected object 504 is the target object. Such an embodiment could be useful in scenarios where, for example, HMD 300 does not yet have sufficient training data regarding reference object 502, perhaps causing HMD 300 to erroneously identify a change in the perceived characteristic as being caused by the reference object. This embodiment could also be useful in scenarios where a plurality of detected objects caused the change in the perceived characteristic. If the wearer desired to interact with only one of the detected objects, then HMD 300 could request confirmation that one of the plurality of detected objects is the target object.

In an embodiment, having identified detected object 504 as the target object, HMD 300 could perform additional operations on the target object. For example, HMD could 300 perform OCR on the target object, as described above. In addition to storing a recognized text, HMD 300 could use the recognized text to present additional information regarding the target object. For example, if the target object is a book found at a bookstore or a DVD found at a movie rental store, HMD 300 could present reviews of that book or DVD, allowing the wearer to determine whether to purchase and/or rent the book or DVD. As another example, if the target object is a food item purchased at a fast food restaurant, HMD 300 could present nutritional information regarding that food item. Those having skill in the art will recognize that numerous other examples are possible as well without departing from the scope of the claims.

As described above, the presentation of additional information regarding the target object could be facilitated by an entity distinct from HMD 300, such as AR server 108 and/or a smartphone in communication with the HMD 300, among other possibilities. One or more data sources 110A-C may store information regarding the target object and provide that information to AR server 108 and/or the smartphone, as examples.

Figure 6:
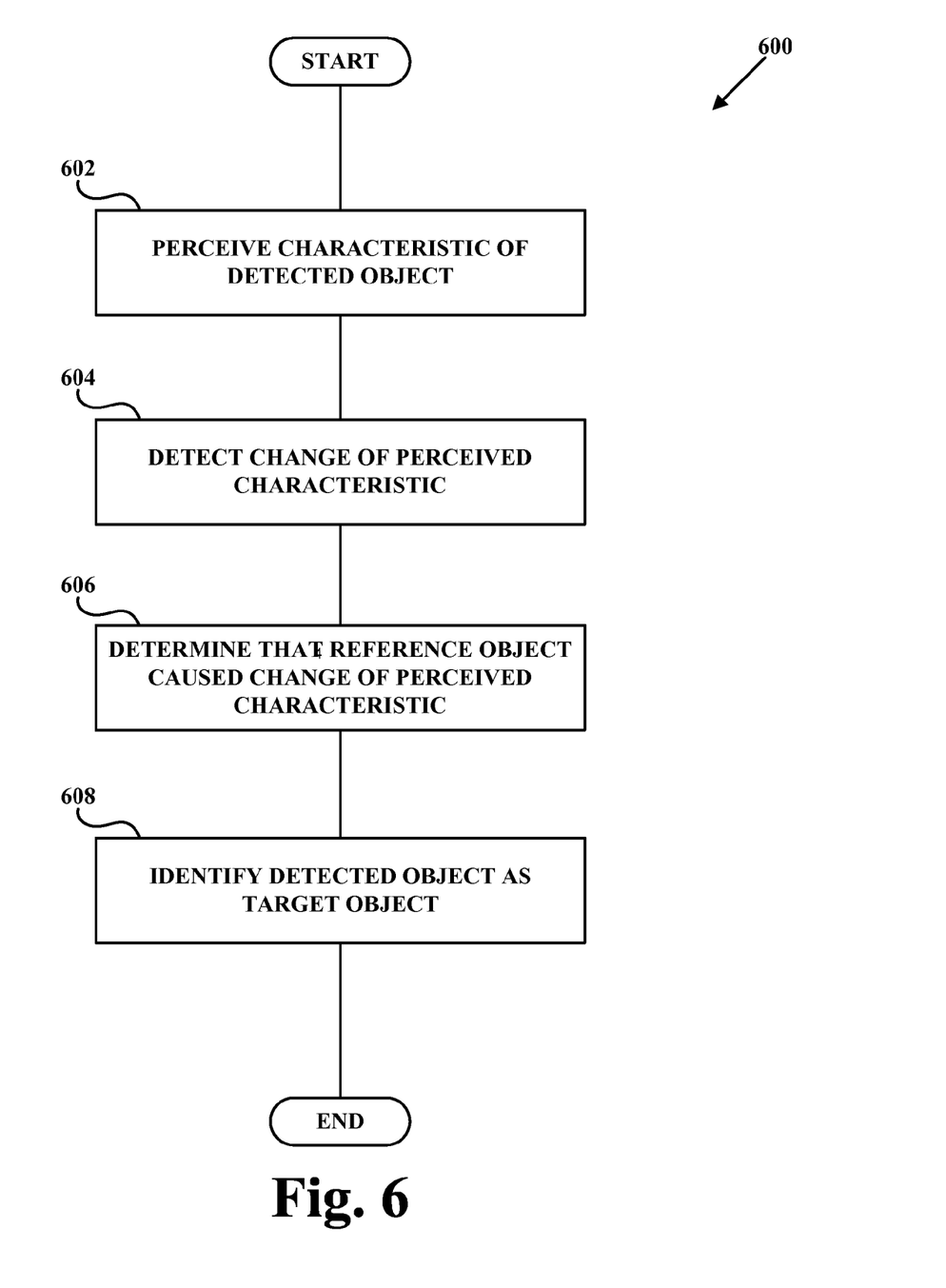
FIG. 6 is a flowchart of a method that can be carried out in accordance with exemplary embodiments.

FIG. 6 depicts a flowchart of an exemplary method. Method 600 is generally similar to method 400, except that, instead of detected object 504 (perhaps located between reference object 502 and HMD 300) causing a change of the perceived characteristic of a reference object (and HMD 300 identifying that detected object as the target object), a reference object between a detected object and HMD 300 causes a change of the perceived characteristic of a detected object.

As shown in FIG. 6, method 600 begins at step 602 with HMD 300 perceiving a characteristic of a detected object. At step 604, HMD 300 detects a change of the perceived characteristic of the detected object. This change could result, for example, because the wearer of HMD 300 placed a finger between a distant target object, such as a movie poster or a fast-food restaurant menu, causing the shape, size, or other characteristic of the detected object to change.

Method 600 continues at step 606 with HMD 300 making a determination that a reference object caused the change of the perceived characteristic. At step 608, HMD 300 identifies the detected object as the target object. Again, HMD 300 could present a prompt requesting a confirmation that the detected object is the target object, and receive the confirmation that the detected object is the target object. This may be appropriate since, when the target object is at a distance, the reference object may point to or cover a plurality of target objects, and thus cause a change of a perceived characteristic for a plurality of detected objects.

Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

The invention claimed is:

1. A computer-implemented method for identifying a target object, the method comprising:
   perceiving a characteristic of a reference object;
   detecting a change to the perceived characteristic of the reference object, wherein the change that has persisted for a minimum threshold of time;
   making a determination, by a computing device, that a detected object caused the change to the perceived characteristic; and
   identifying the detected object as the target object.

2. The method of claim 1, wherein the computing device comprises a head-mounted display.

3. The method of claim 1, wherein perceiving the characteristic of the reference object comprises receiving one or more images from a camera.

4. The method of claim 1, wherein the characteristic is one of a shape, a color, a size, an area, and a location.

5. The method of claim 1, wherein the reference object is a body part selected from the group consisting of an arm, a hand, a finger, a leg, a foot, and a toe.

6. The method of claim 1, wherein identifying the detected object as the target object comprises (i) presenting a prompt via a user interface of the computing device requesting a confirmation that the detected object is the target object, and (ii) receiving the confirmation via the user interface of the computing device.

7. The method of claim 1, further comprising:
   presenting a prompt via a user interface of the computing device requesting a selection of an object to use as the reference object;
   receiving a selected object via the user interface of the computing device; and
   using the selected object as the reference object.

8. A computer-implemented method for identifying a target object, the method comprising:
   perceiving a characteristic of a detected object;
   detecting a change to the perceived characteristic of the detected object, wherein the change that has persisted for a minimum threshold of time;
   making a determination, by a computing device, that a reference object caused the change of the perceived characteristic; and
   identifying the detected object as a target object.

9. The method of claim 8, wherein the computing device comprises a head-mountable device.

10. The method of claim 8, wherein perceiving the characteristic of the detected object comprises receiving one or more images from a camera.

11. The method of claim 8, wherein the characteristic is one of a shape, a color, a size, an area, and a location.

12. The method of claim 8, wherein the reference object is a body part selected from the group consisting of an arm, a hand, a finger, a leg, a foot, and a toe.

13. The method of claim 8, wherein identifying the detected object as the target object comprises:
   presenting a prompt via a user interface of the computing device requesting a confirmation that the detected object is the target object; and
   receiving the confirmation via the user interface of the computing device.

14. The method of claim 8, further comprising:
   presenting a prompt via a user interface of the computing device requesting a selection of an object to use as the reference object;
   receiving a selected object via the user interface of the computing device; and
   using the selected object as the reference object.

15. A system, comprising:
   at least one processor; and
   data storage comprising program instructions executable by the at least one processor to cause the at least one processor to perform functions comprising:
      perceiving a characteristic of a reference object;
      detecting a change to the perceived characteristic of the reference object, wherein the change that has persisted for a minimum threshold of time;
      making a determination that a detected object caused the change to the perceived characteristic; and
      identifying the detected object as the target object.

16. The system of claim 15, wherein the at least one processor comprises at least one processer of a head-mountable device.

17. The system of claim 15, further comprising a camera; and wherein perceiving the characteristic of the reference object comprises receiving one or more photos from the camera.

18. A non-transitory computer-readable medium having stored therein instructions, that when executed by a computing system, cause the computing system to perform functions comprising:

perceiving a characteristic of a reference object;

detecting a change to the perceived characteristic of the reference object, wherein the change that has persisted for a minimum threshold of time;

making a determination that a detected object caused the change to the perceived characteristic; and identifying the detected object as the target object.

* * * * *

UNITED STATES PATENT AND TRADEMARK OFFICE
CERTIFICATE OF CORRECTION

PATENT NO. : 8,724,853 B2
APPLICATION NO. : 13/493758
DATED : May 13, 2014
INVENTOR(S) : Prada Gomez et al.

Page 1 of 1

It is certified that error appears in the above-identified patent and that said Letters Patent is hereby corrected as shown below:

In the Claims:

Claim 1, Column 9, line 55: "that" should be deleted.

Claim 8, Column 10, line 21: "that" should be deleted.

Claim 15, Column 10, line 58: "that" should be deleted.

Claim 18, Column 11, line 10: "that" should be deleted.

Signed and Sealed this
Fifth Day of August, 2014

Michelle K. Lee
*Deputy Director of the United States Patent and Trademark Office*